United States Patent [19]
Ashley

[11] Patent Number: 5,983,540
[45] Date of Patent: Nov. 16, 1999

[54] METHOD AND TAGGING SYSTEM FOR MARKING AND IDENTIFYING BIRDS

[76] Inventor: Roger D. Ashley, 363 Hiway 32, Fair Play, Mo. 65649

[21] Appl. No.: 08/827,950

[22] Filed: May 2, 1997

[51] Int. Cl.⁶ ........................................................ G09F 3/00
[52] U.S. Cl. ................................ 40/300; 40/662; 40/663; 40/668
[58] Field of Search ................................ 24/704.1, 704.2, 24/711.1; 40/300, 301, 662, 663, 664, 668; 206/343, 345, 346, 348

[56] References Cited

U.S. PATENT DOCUMENTS

| | | |
|---|---|---|
| Re. 29,536 | 2/1978 | Fearing . |
| 1,657,865 | 1/1928 | Merle, Sr. .................................. 40/664 |
| 1,737,201 | 11/1929 | Reimer . |
| 3,103,666 | 9/1963 | Bone ........................................ 227/67 |
| 3,552,051 | 1/1971 | Ritchey . |
| 3,675,357 | 7/1972 | Magee ...................................... 40/300 |
| 3,686,717 | 8/1972 | Merser ...................................... 24/298 |
| 3,765,110 | 10/1973 | Olsen ....................................... 40/663 |
| 3,765,113 | 10/1973 | Magee ...................................... 40/300 |
| 3,850,297 | 11/1974 | Merser .................................... 206/343 |
| 4,263,730 | 4/1981 | Clements ................................. 40/663 |
| 4,633,606 | 1/1987 | Cohr . |
| 4,739,565 | 4/1988 | Reggers . |
| 4,790,090 | 12/1988 | Sharber .................................... 40/300 |
| 5,321,872 | 6/1994 | Merser ................................... 24/704.1 |
| 5,373,656 | 12/1994 | Merser ...................................... 40/663 |

FOREIGN PATENT DOCUMENTS

| | | | |
|---|---|---|---|
| 535028 | 10/1931 | Germany ................................. 40/301 |
| 1053454 | 1/1967 | United Kingdom ..................... 40/301 |
| 1320454 | 6/1973 | United Kingdom ..................... 40/300 |
| 1372769 | 11/1974 | United Kingdom ..................... 40/300 |

*Primary Examiner*—Terry Lee Melius
*Assistant Examiner*—Andrea Chop
*Attorney, Agent, or Firm*—Lathrop & Gage, L.C.; Joseph L. Johnson; William A. Rudy

[57] ABSTRACT

A method and apparatus for marking and identifying birds. The tagging system includes a securing filament, an anchor tag and an identification tag. Both the anchor tag and the identification tag are provided with holes for reception of the securing filament. The securing filament is pierced through approximately one-half inch of the neck skin of the bird, and is secured by placement of the anchor tag on one side of the pierced skin and the identification tag on the opposed side of the pierced skin. The securing filament is provided with opposed cylindrical restriction bar which pass through the reception holes in the anchor tag and the identification tag thereby securing each tag between the pierced skin and a cylindrical restriction bar. One of the cylindrical restriction bars is rigid while the opposed cylindrical restriction bar is flexible and may be flexed substantially parallel to the body of the securing filament for passage through the hole in the anchor tag, the identification tag and the pierced skin.

9 Claims, 2 Drawing Sheets

METHOD AND TAGGING SYSTEM FOR MARKING AND IDENTIFYING BIRDS

BACKGROUND OF THE INVENTION

1. Field of the Invention

The present invention relates to a method and tagging system for marking and identifying small animals, in particular birds. The tagging system incorporates a panel type identification tag which is affixed to the neck flesh of the bird by a resilient filament type fastener which is forced through the neck flesh and held in place by an anchor tag. This tagging system is utilized for marking and identifying birds, much as tags commonly placed in the ears of cattle, swine and sheep.

2. Prior Art

The invention relates to the art of marking animals for identification purposes. Identification methods have long been used to mark livestock so that the owner can distinguish his animals from those of others and so that each animal can be readily identified. Early animal identification means included branding or tattooing the animal or numbered or lettered tags suspended from the animal's neck from a chain. Cost of this marking method as well as problems with the chain becoming caught on objects led to the development of alternative marking systems. One such system disclosed as Claffey U.S. Pat. No. 2,325,906 provided for a metal tag to be inserted and fixed through a hole pierced in the animal's ear. Again, cost of the metal tags were relatively high and the tags heightened the possibility of injury to the animal and of infection.

Technological advances resulted in the availability of plastic tags either stamped from stock or injection molded. Plastic or rubber tags are cheaper to make, durable, resistant to corrosion and are generally easier to manipulate during the securing process. Problems similar to those encountered with metal tags occurred with controlling large animals during the process of cutting a hole in the animal's ear and then forcing the tag therethrough. Tools were developed which allowed the piercing process and tag affixing process to be conducted simultaneously. An early example is disclosed in the Ritchey U.S. Pat. No. 3,552,051.

Marking tags currently available on the market are generally plastic or rubber and provide a planar surface for placement of the identifying markings. The planar portion of the tag will generally taper to an elongated neck which ends in an anchoring means. One such tag is disclosed in the Fearing U.S. Pat. No. Re. 29,536. The known prior inventions pertaining to the tagging of animals for identification purposes generally relate to large mammals and require piercing of the ear. Convenient, low-cost marking devices have not been developed for small animals, in particular, birds.

Birds present an especially difficult problem for marking for identification as they lack external ears. Therefore, tags such as those used for marking cattle by insertion through the ear are not available for marking the birds. Further, tags suspended from the bird's neck by chain or other connector endangers the safety of the bird as such devices may become caught on projecting objects. Branding or tattooing the bird is of little benefit as birds have little exposed flesh which would allow the brand or tattoo to be read without close inspection. Feathers which are removed in order to brand or tattoo are likely to grow back in a short period of time.

Two marking devices have been used for marking and identifying birds with limited success. The first is a metal clip which is crimped onto the anterior portion of the bird's wing. The second is an annular band which is fastened about one of the bird's legs, commonly by crimping the band either by hand or with pliers. Both of these marking methods have the disadvantage of providing identifying markings which are small and usually require handling of the bird to read the markings. Birds, particularly those raised for consumption, such as turkeys and chickens, tend to group together and move in clusters. Therefore, it is difficult to identify birds by small marking bands attached either to the leg or wing.

Another problem with leg bands or wing tags is that they are generally formed of metal for durability reasons. It is not uncommon for a bird to injure itself, or other birds, with metal bands or tags, particularly when the birds group together. Leg bands must be somewhat loose so that the bird can grow without the band cutting off circulation in the leg. However, loose leg bands may become caught on protruding objects such as loose fencing or unseated nails.

Yet another problem with leg bands and wing tags is that both must be securely fastened so that they do not fall off of the animal during normal movement. It is often desirable to change identification numbers or markings on the bands. This is particularly true when markings on identification tags are utilized to indicate medical conditions of the animal or where records of egg production or lineage are maintained. For example, it may be desirable to add a letter to the identification band to indicate that the animal is to receive special food or medication or to indicate lineage. The ability to alter identification tags is particularly desirable in testing or experimentation settings. Leg bands and wing tags generally have to be removed in order to change the markings thereon. Often, the leg band or wing tag is destroyed during the removal process.

There is the need for an inexpensive marking system for birds which is easy to apply and which allows quick, easy identification of a bird without having to handle the animal for close inspection of the marking device. Further, there is a need for a bird identification system which is safe for use on the bird, which can easily be removed and which does not impede the normal growth of the animal.

Accordingly, it is the object and purpose of the tagging system of the present invention to provide a method and apparatus that overcomes the stated deficiencies of the prior art by providing an identification and marking system for birds which allows quick and easy identification of each marked bird without handling the animal, even when the birds are clustered together.

Another object and purpose of the present invention is to provide a tagging system which is inexpensive, easy to apply and easy to remove.

Yet another object and purpose of the present invention is to provide a tagging system which is safe for the bird, which prevents injury to other birds and which does not impede the normal growth of the bird.

3. SUMMARY OF THE INVENTION

The bird tagging system of the present invention is comprised of an identification tag, a resilient securing filament and an anchor tag. The anchor tag and the identification tag are substantially planar and each is provided with a hole for attachment to the securing filament. The securing filament has a resilient filament body similar to that disclosed in the Olsen U.S. Pat. No. 3,765,110, and is similarly provided with cylindrical restriction bars at opposing ends of the connector. One cylindrical restriction bar is provided with gusset plates which limits the flexibility of that restriction bar. The opposing cylindrical restriction bar does not have gusset plates and may be flexed substantially parallel to the securing filament for the purpose of sliding the anchor tag and the identification tag onto the securing filament body and for passing the securing filament through the pierced neck flesh.

The method utilizing the tagging system includes flexing the flexible restriction bar parallel to the filament body and sliding the identification tag onto the securing filament with any markings on the planar face directed toward the cylindrical restriction bar provided with gusset plates. The opposing flexible cylindrical restriction bar, while still flexed parallel to the filament body, is fitted into a needle application gun of the type commonly used for securing animal marking tags. The bird is held tightly and the operator pinches approximately one-half inch of neck skin in an upward direction. The needle housing the flexible cylindrical restriction bar of the securing filament is forced completely through the neck flesh of the animal with the applicator gun.

Actuation of the applicator gun trigger passes the securing filament through the needle and thereby causes the flexible cylindrical restriction bar to extend through the flesh of the bird's neck. Upon withdrawal of the needle from the flesh, the identification tag is suspended from the securing filament between the flesh of the bird and the gusset-fitted cylindrical restriction bar. The anchor tag is then passed over the flexible cylindrical restriction bar onto the body of the securing filament thereby preventing the securing filament to be pulled back through the flesh of the bird.

DESCRIPTION OF THE PREFERRED EMBODIMENT

Figure 1:
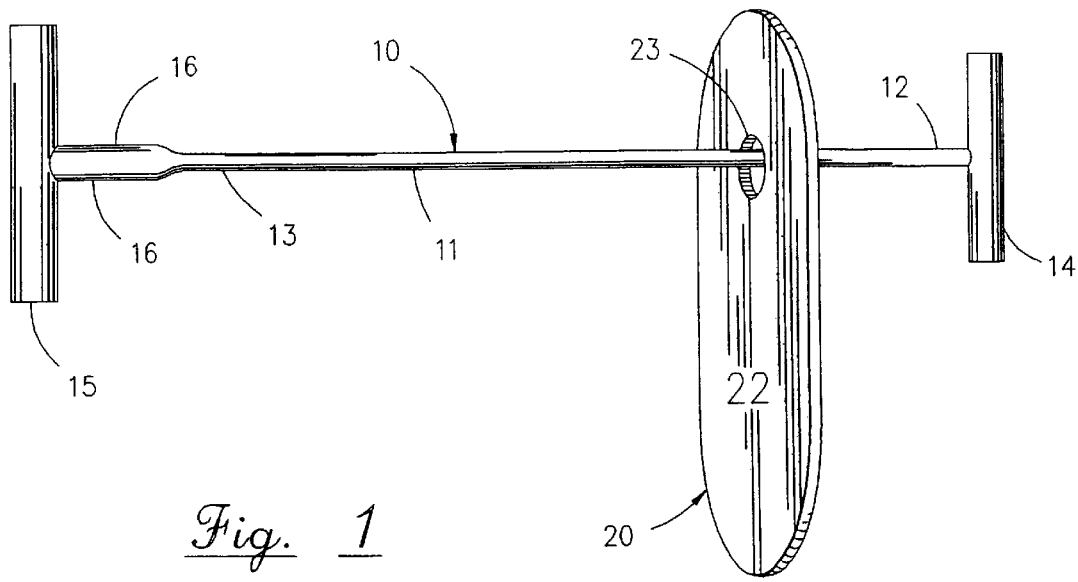
FIG. 1 is a front elevation view of the securing filament with an identification tag slidably attached thereon.

Referring to the drawings in detail, FIG. 1 illustrates an overall view of the bird tagging and identification system including a securing filament 10 and an identification tag 20. The identification tag 20 is substantially planar and is provided with a display panel 22 adapted to receive identification indicia. A hole 23 is provided in the identification tag for receiving the securing filament 10.

The securing filament 10 includes a long stretched section 11 further having a first end 12 and a second end. 13 A flexible restriction bar 14 is flexibly attached substantially perpendicular to the first end 12 of the long stretched section 11. A rigid restriction bar 15 is fixedly attached substantially perpendicular to the second end 13 of the long stretched section 11. The flexible restriction bar 14 may be flexed substantially parallel to the long stretched section 11 for receiving the identification tag 20 through the hole 23 provided therein. The rigid restriction bar 15 is secured substantially perpendicular to the long stretched section by opposing gusset plates 16 which restrict the flexibility of the rigid restriction bar 15 thereby preventing loss of the identification tag 20 once it is positioned on the securing filament 10. The display panel 22 is positioned adjacent to the rigid restriction bar 15 when the identification tag 20 is placed on the securing filament 10.

Figure 2:
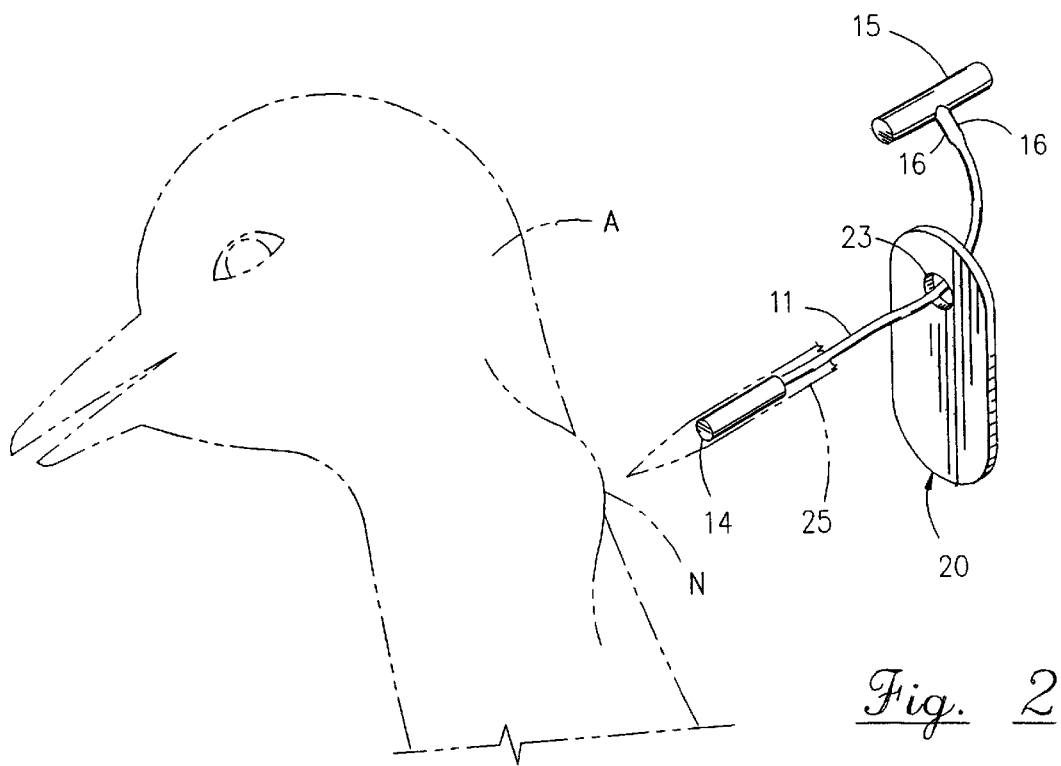
FIG. 2 is a perspective view of the head of a bird with neck flesh pinched and prepared for insertion of a tool having the flexible end of the securing filament therein and having an identification tag slidably attached on the securing filament.
Figure 3:
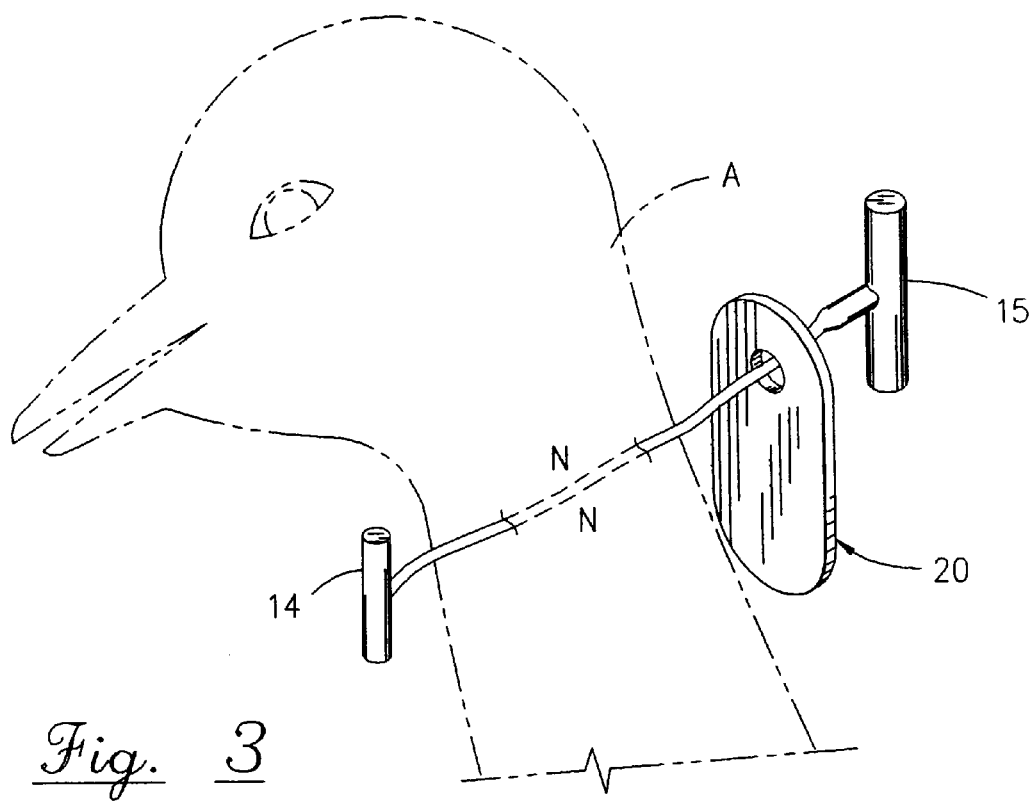
FIG. 3 is a perspective view of the head of a bird with the tagging system pierced through the neck flesh and having the identification tag in place.

Referring to FIG. 2, in the present embodiment, the flexible restriction bar 15 is flexed substantially parallel to the long stretched section 11 and placed within a hollow application needle 25 as is commonly used in securing animal identification tags. A bird A is held and its neck skin N is pinched upward. The hollow application needle 25 is pushed completely through the neck skin N. Once the hollow application needle 25 is through the neck skin N the flexible restriction bar 14 is removed from the hollow application needle 25. FIG. 3 depicts the orientation of the identification tag 20 as it is slidably restrained between the neck skin N and the rigid restriction bar 15 after the securing filament 11 has pierced the neck skin N and the hollow applicator needle 25 is removed.

Figure 4:
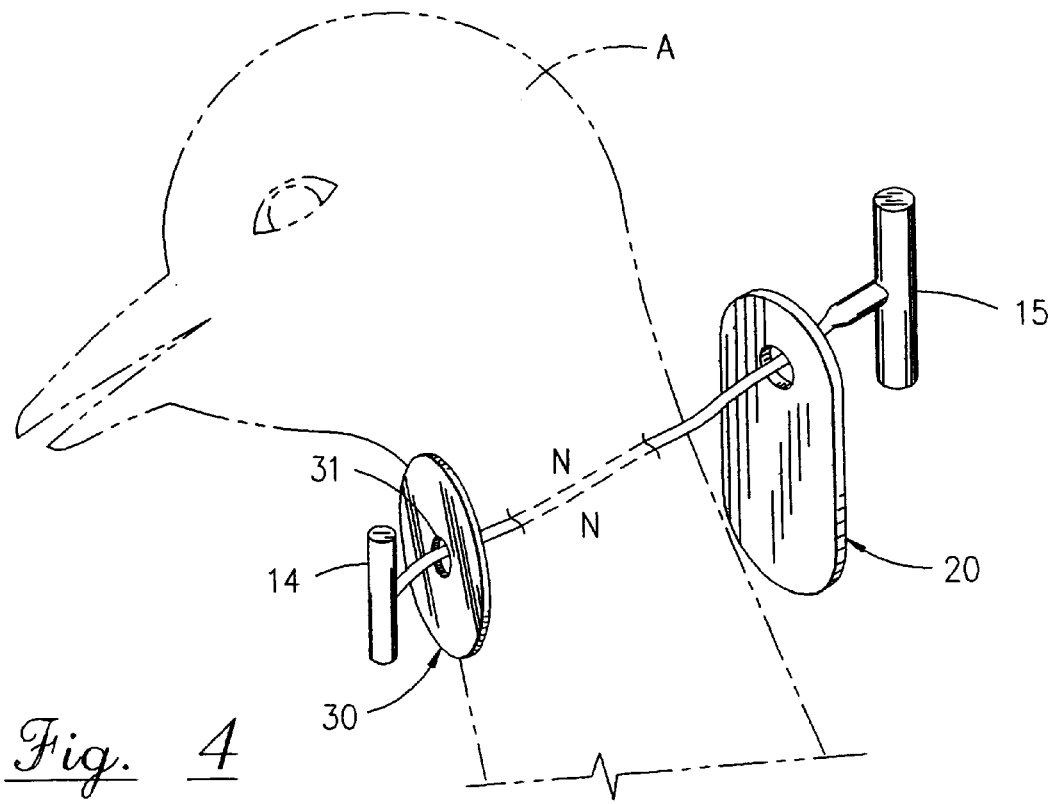
FIG. 4 is a perspective view of the complete tagging system showing the securing filament through the neck flesh of the bird with the identification tag and anchoring tag in place.

FIG. 4 depicts the final orientation of a complete tagging system. The flexible restriction bar 14 is flexed substantially parallel to the long stretched section 11 of the securing filament 20. An anchor tag 30 is provided with an opening 31 therethrough. The flexible restriction bar 14 is place through the opening 31 in the anchor tag 30. The flexible restriction bar is then flexed perpendicular to the long stretched section 11 thereby restraining the anchor tag 30 between the flexible restriction bar 14 and the neck skin N. This configuration ensures that the flexible restriction bar 14 will not be pulled back through the pierced neck skin N. While the tagging system can be inserted anywhere on the neck of the bird A, it is preferable to insert the tagging system on the back of the neck for ease of viewing the identification tag 20.

Whereas the present invention has been described in relation to the drawings attached hereto, it should be understood that other and further modifications, apart from those shown or suggested herein, may be made within the spirit and scope of this invention.

What is claimed is:

1. Method for marking birds comprising the steps of:
   (a.) securing an identification tag on a securing filament;
   (b.) pinching approximately one-half inch of neck skin on a bird;
   (c.) inserting the securing filament through the neck skin; and
   (d.) securing an anchor tag on said securing filament, said anchor tag secured opposite said identification tag.

2. Method for marking birds for identification comprising the steps of:
   a) pinching approximately one-half inch of neck skin on a bird;
   b) sliding an identification tag onto a securing filament having a first end and a second end;
   c) inserting the first end of the securing filament through the neck skin in a manner which traps the identification tag between the neck skin and the second end of said securing filament; and
   d) sliding an anchor tag onto the first end of the securing filament after inserting the securing filament through the neck skin so that said anchor tag is trapped between said first end of the securing filament and the neck skin.

3. Method of claim 2 wherein a tag applicator needle is used to insert the securing filament through the neck skin.

4. Method of claim 2 wherein a tag applicator gun is used to insert the securing filament through the neck skin.

5. Method for marking birds for identification comprising the steps of:
   a) sliding an identification tag onto a securing filament, said securing filament having a first end and a second end;
   b) placing the first end of said securing filament into a hollow tag applicator needle;
   c) pinching approximately one-half inch of neck skin on a bird;
   d) forcing the tag applicator needle and the first end of said securing filament through the neck skin; and
   e) removing the tag applicator needle leaving behind the securing filament and the attached identification tag trapped between the second end of the securing filament and the neck skin.

6. Method of claim 5 adding the step of sliding an anchoring tag onto the first end of the securing filament after forcing the tag applicator needle and the first end of said securing filament through the neck skin such that said anchoring tag is trapped between said first end of the securing filament and the neck skin.

7. Method of claim 5 where the securing filament is placed through the neck skin of the bird at the back of the bird's neck.

8. A bird tagging system for marking and identifying birds which comprises:
   (a) a securing filament having a long stretched section of predetermined length, a first end and a second end, said first end having a flexible cylindrical restriction bar flexibly attached substantially perpendicular to the long stretched section of said securing filament, said second end having a rigid cylindrical restriction bar fixedly attached substantially perpendicular to the long stretched section of said securing filament;
   (b) an anchor tag having an opening therethrough to receive the first end of said securing filament; and
   (c) an identification tag having a planar body portion adapted to receive identification indicia, said identification tag further having an opening therethrough to receive the first end of said securing filament.

9. A bird tagging system as set forth in claim 8 wherein opposed gusset plates fix the rigid cylindrical restriction bar of the second end to said long stretched section of the securing filament.

* * * * *